Nov. 26, 1963  A. L. MILLER  3,111,942
HOT WATER DISTRIBUTION SYSTEM
Filed July 6, 1962
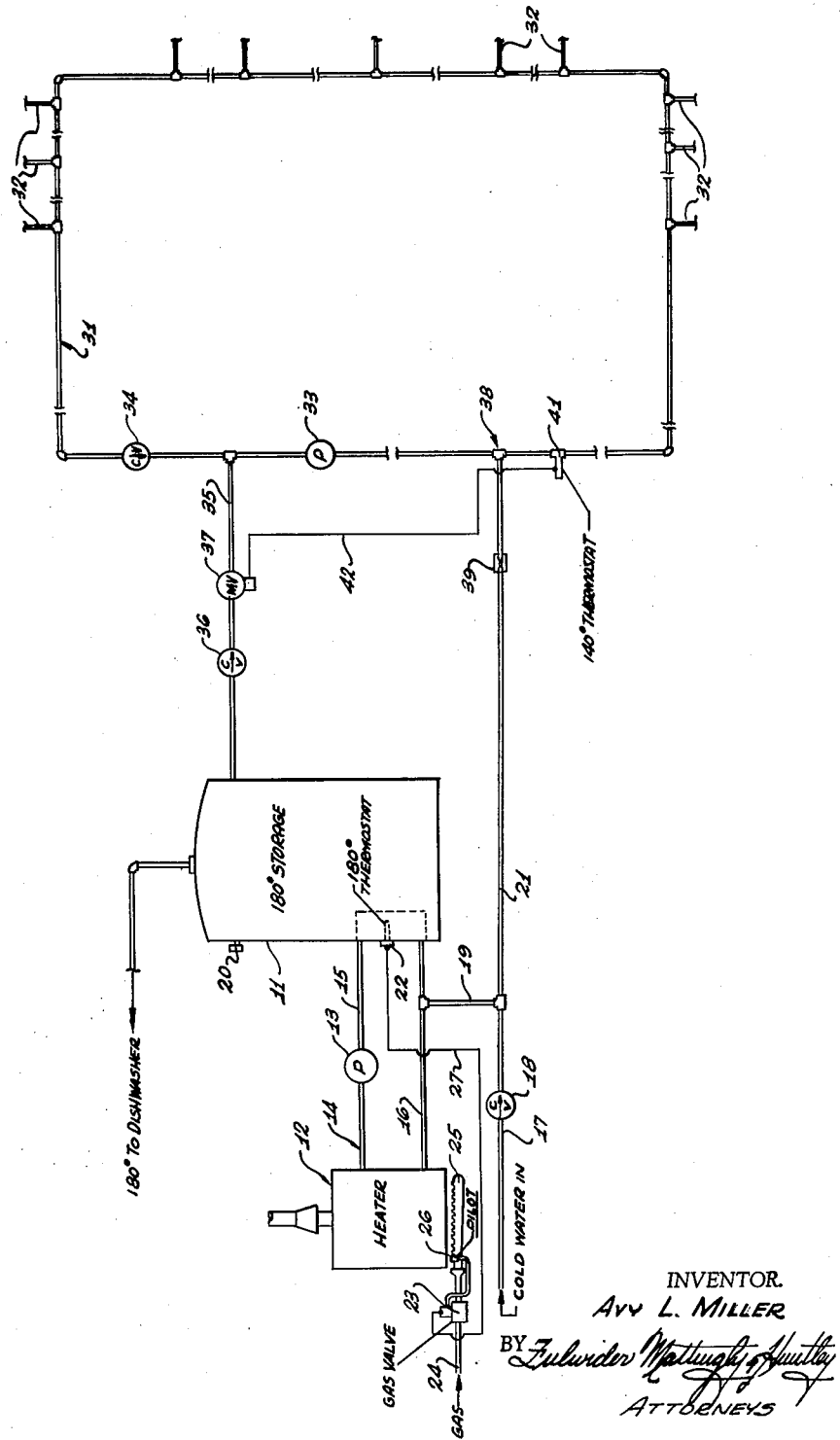
INVENTOR.
AVY L. MILLER
BY
ATTORNEYS `3,111,942`
HOT WATER DISTRIBUTION SYSTEM
Avy L. Miller, 13246 Saticoy St.,
North Hollywood, Calif.
Filed July 6, 1962, Ser. No. 207,991
10 Claims. (Cl. 126—362)

The present invention relates generally to a hot water distribution system, and more particularly to such a system employing a circulating consumer distribution loop wherein the circulating water is maintained at substantially constant temperature regardless of consumption therefrom.

In supplying automatic dishwashers and other equipment, it is desired to supply hot water at a quite high temperature, usually on the order of 180° F. or above. Indeed, health department requirements may call for the supply of hot water at not less than 180° F. for dishwashing and rinsing operations to minimize pathological organisms on dishes and cooking utensils. To supply this requirement, it is therefore necessary that a relatively large supply of hot water be available in storage or by instantaneous heating at not less than 180° F.

At the same time, it is desired to supply hot or warm water at a low temperature, for example on the order of 140° F., for consumer uses such as the washing of body surfaces. Therefore, when water is supplied at 180° F. it is necessary to temper this water by mixing with cold water to deliver water at the desired consumer temperature of 140°.

In the past, the tempering of the high temperature water for human consumption has been accomplished in mixing valves where regulated quantities of 180° hot water and cold water from the supply have been mixed together to deliver water from the valve at substantially 140° for distribution to the consumer fixtures.

To secure more uniform distribution of the lower temperature water to consumer fixtures, the lower temperature water has been supplied into a distribution loop around which it is constantly circulated so that the temperature around the loop is substantially even. This system has worked fairly well during periods of more or less continuous consumption from one or more of the consumer fixtures, when there has been replenishment of the water in the loop from the mixing valve.

However, where there has been no consumption from such prior distribution loops over a relatively long period of time, the temperature of the water within the loop has become lowered by heat losses therefrom so that the water circulating through the loop has been cooled to an undesirable degree below the selected delivery temperature of substantially 140° F. Such a lower temperature within the loop has meant that a consumer would receive cooled water from his hot water fixture for a considerable length of time, until the water between the fixture and the point of supply to the loop would be flushed out and replaced by the 140° water from the mixing valve.

According to the present invention, a continuously circulating hot water distribution loop is used to supply the consumer fixtures therearound, and the water within the distribution loop is maintained substantially constant at the selected temperature, for example 140° F., regardless of the consumption from consumer fixtures and the failure of consumers to withdraw water from the loop for long periods of time. According to a preferred embodiment of the invention, this is accomplished where no water is withdrawn from the loop by selectively adding high temperature water to the water in the loop when its temperature falls below the selected consumer distribution temperature so as to bring the water within the loop up again to the selected distribution temperature. At the same time, excess water will be withdrawn from the loop to the hot water storage tank or other reservoir.

It is therefore an object of the present invention to provide a hot water distribution system wherein hot water is supplied to consumer fixtures at a constant temperature, regardless of consumption.

Another object of this invention is the provision of a hot water distribution system relivering water at different selected temperatures and delivering the water at substantially immediate constant temperature regardless of the lack of previous consumption thereof.

A further object of this invention is the provision of a hot water distribution system employing a circulating hot water distribution loop in which high temperature water and cold water are mixed in the loop during periods of consumption therefrom to maintain a desired distribution water temperature, and in which high temperature water alone is added to the loop during a period of no consumption to replace heat looses and maintain the desired distribution water temperature.

A still further object of this invention is the provision of a hot water distribution system delivering hot water at a high temperature for equipment use and at a lower temperature for consumer distribution, in which the consumer water is maintained in a continuously circulating loop feeding the consumer fixtures, in which high temperature water and cold water supply are mixed in the loop during periods of consumer use to maintain the water temperature in the loop, and in which high temperature water only is added to the loop during periods of low or no consumption to maintain the desired distribution temperature in the loop.

Yet another object of this invention is the provision of a hot water distribution system employing a continuously circulating consumer distribution loop into which high temperature water and cold water are separately introduced during consumption periods to maintain a desired lower distribution temperature in the loop and in which high temperature water only is added to the loop to maintain the selected temperature therein during periods when no water is taken from the loop and in which excess water passes from the loop in reverse direction through the cold water supply pipe.

Another object of this invention is the provision of a hot water distribution system supplying high temperature water for equipment usage and lower temperature water in a distribution loop for human consumption, in which the water in the loop is continuously circulated by a pump, in which high temperature water replaces water withdrawn from the loop on the intake side of the pump and cold water replaces water withdrawn from the loop on the outlet side of the pump, and in which a thermostat responsive to water temperature downstream of the cold water input to the loop controls the relative amounts of hot and cold water supplied to the loop to maintain a selected distribution temperature for the water in the loop.

These and other objects and features of the invention will be readily apparent to those skilled in the art from the following specification and the appended drawing, in which the FIGURE shows a water distribution system according to the present invention.

The drawing figure illustrates a presently preferred embodiment of the invention in which high temperature water at, for example, 180° F. is stored in a tank 11 and the temperautre of the stored water maintained by a heater 12. Water from the tank is continuously circulated by a pump 13 through a heating loop 14 including an upstream leg 15, the heat exchanger of heater 12, and a downstream leg 16. The cold water supply pipe is indicated at 17, feeding through a check valve 18 to cold water pipes 19 and 21. The cold water pipe 19 is connected to the downstream leg 16 of the heating loop 14 to maintain the supply of water within the storage tank 11 as hot water is withdrawn therefrom. A pressure relief valve is shown at 20.

Water from the storage tank 11 is continuously circulated through the heating loop 14 by the pump 13, but heat is supplied thereto only as called for by a thermostat 22 projected into the storage tank 11 and responsive to the temperature of the water in the lower part thereof. The thermostat 22 controls a gas valve 23 controlling the supply of fuel from a supply pipe 24 to a burner 25. When the ambient water about the thrmostat 22 declines in temperature below 180°, the thermostat will open gas valve 23 to supply fuel from the supply 24 to the burner 25 wherein it is ignited by continuously burning pilot 26. Heat is thereby supplied to the water circulating through the loop 14 by the heater 12 until the temperature of the water within the tank 11 at the thermostat 22 again reaches 180°, at which time the thermostat is satisfied to close the valve 23 and terminate the supply of fuel to the burner 25.

The connection indicated schematically at 27 between the thermostat 22 and gas valve 23 may be a conventional electrical connection to a solenoid operated gas valve, or may be a hydraulic line from an expansion element in the thermostat 22 to a pressure operated gas valve at 23. Such control arrangements are conventional in the art. The consumer distribution loop at 31 is arranged to feed a plurality of consumer stations therealong, such as wash bowls, showers, and tubs, fed by consumer fixture pipes 32 spaced around the loop. The water in the loop 31 is continuously circulated by a pump 33, and a check valve 34 insures flow in one direction only, as indicated by the arrow on the valve. A high temperature water supply line 35 interconnects the storage tank 11 and the loop 31 between the check valve 34 and the pump 33 and on the upstream or input side of the latter. In the high temperature water supply pipe 35 are a check valve 36, insuring flow in the direction from the tank 11 only, and a modulating valve 37 controlling the amount of high temperature water passing through the pipe 35. The cold water pipe 21 connects to the loop 31 at a point 38 which is on the downstream or outlet side of the pump 33, and has therein a restricted portion 39 for a purpose to be hereinafter explained.

A thermostat 41 is located downstream of the point 38 and upstream of all the fixture feed pipes 32 and is responsive to the temperature of the water in the loop 31 at its location. The thermostat 41 controls the modulating valve 37 through a connection illustrated diagrammatically at 42, which may be electrical, hydraulic, or mechanical. Such thermostatically controlled modulating valves are well known and operate to open the modulating valve an amount governed by the variation between the temperature at which the thermostat is set to operate and the temperature of the medium to which it is responsive. In the distribution loop according to the present invention, the temperature of the water in the loop at the thermostat 41 will govern the amount which the modulating valve 37 opens, and the amount of water delivered from the storage tank 11 into the distribution loop 31.

The purpose of the restriction 39 in the cold water pipe 21 is to place the control of the relative quantities of high temperature and cold water fed to the distribution loop 31 in the modulating valve 37, where the incoming water replaces water withdrawn from the loop. Because of the restriction on the amount of cold water which can pass from the cold water pipe into the loop 31, the modulating valve 37 will, by the amount it is opened, control the proportions of high temperature water and cold water which are delivered into the loop to replace the water removed therefrom. Thus, with the modulating valve 37 wide open, a high percentage of high temperature water will be delivered into the distribution loop because of the restriction 39; while with the modulating valve 37 throttled down, only a minor percentage of the replacement water comes from the high temperature water supply.

In describing the operation of the hot water distribution system according to the present invention, it will first be assumed that the water in the distribution loop 31 is at the desired distribution temperature as set on the thermostat 41, and the modulating valve 37 is closed. Under conditions of no consumption from the loop, the water will continuously circulate therein to maintain an even temperature at the fixture supply pipes 32, and no water will be added into the loop. Assuming now that a fixture is opened to withdraw water from the loop therethrough, the water will first be replaced with cold water from the pipe 21 because it was originally assumed that the valve 37 is closed. This cold water enters the loop at the point 38, and almost immediately comes in contact with the thermostat 41 to effect opening of the modulating valve 37 due to the response of the thermostat 41 to the incoming cold water. As the valve 37 opens, high temperature water is supplied to the loop 31 at the upstream or intake side of the pump 33. This high temperature water passes through the pump to the point 38 where it mixes with the incoming cold water from the pipe 21 (whose supply has been diminished because of the opening of the valve 37) and the mixed high temperature and cold water influence the thermostat 41 to modulate the opening of the valve 37 so that the relative quantities of high temperature and cold water are regulated to produce the desired distribution temperature at the thermostat 41 after they are mixed; for example, at a desired setting of 140° F. This 140° water then continues its circulatory path in the loop 31 so that the temperature of the water therein supplied to the fixture pipes is maintained substantially constant at the desired set temperature. When all fixtures are turned off, so that there is no consumption from the loop 31, the system returns to the initially assumed condition with 140° water circulating in the loop 31 and the modulating valve 37 closed so that no water is added into the distribution loop.

Now, assuming a condition where there has been no consumption from the loop 31 for a relatively long period of time, the circulating water therein will fall below the desired distribution temperature of 140° because of heat losses throughout the loop. If this temperature were permitted to so fall, eventually it would reach an undesirably low or tepid temperature where, if a fixture were turned on, it would require a long wait before the tepid water would be flushed from the distribution loop and replaced by water delivered at the desired consumption temperature of 140°. To prevent this delay in delivery of proper temperature water to a fixture, high temperature water is fed into the distribution loop to maintain the temperature of the water therein at the desired delivery temperature during periods of no consumption from the loop.

According to the present invention, when the temperature of the water in the loop falls below the desired delivery temperature of 140°, the thermostat 41 responds to open the modulating valve 37. No water has been withdrawn from the loop; but, since there is a small pressure differential across the pump 33, water will be sucked into the distribution loop through the pipe 35, upstream of the pump 33. Since there would otherwise be an excess of water in the closed distribution loop, the hot water resulting from the mixture of the high temperature water from the storage tank and the water in the loop will be forced out of the loop in reverse flow through the cold water pipe 21 in an amount equal to the amount of high temperature water which entered the loop through the pipe 35. Some of this hotter mixed water continues in the loop past the point 38 and its temperature is read by the thermostat 41 which modulates the valve 37 so that only sufficient water is permitted to flow through the pipe 35 to maintain the mixed water flowing past the thermostat 41 at the set delivery temperature of 140°. When all the water circulating in the loop 31 has been again brought up to 140°, the thermostat 41 will be continuously satisfied and will maintain the valve 37 closed until such time as the temperature of the water circulating in the loop again falls below 140° or water is withdrawn from the loop at a consumer fixture.

The water forced from the loop and in reverse direction through the cold water pipe 21 is prevented from backing up in the cold water pipe 17 by the check valve 18, and instead flows through the cold water pipe 19 into the leg 16 of the heating loop 14 and into the storage tank 11 to replace the high temperature water withdrawn therefrom through the pipe 35 into the distribution loop. The check valve 18, by preventing the mixed but hot water backing up in the pipe 17, prevents a dangerous condition in which only hot water would be supplied to the loop to replace water withdrawn therefrom; that is, the water which might otherwise back up into the cold water supply pipe 17 might be considerably above the desired delivery temperature of 140° and, hence, even with the valve 37 closed, water might be supplied into the loop 31 from the backed-up cold water pipes at a scalding temperature. With the check valve 18 provided, the system will, at the worst, have to flush hot water only out of the short pipe 21, and immediately thereafter cold water is supplied into the distribution loop.

It will be noted that the thermostat 41 is located upstream of all of the fixture supply pipes 32, with reference to the points of entry of outside water into the distribution loop, so that the thermostat 41 will be responsive to the water flowing in the loop before it is fed to any of the consumer fixture supply pipes.

While a certain preferred embodiment of the invention has been specifically illustrated and described, it will be understood that the invention is not limited thereto as many variations will be apparent to those skilled in the art, and the invention is to be given its broadest interpretation under the terms of the following claims.

I claim:

1. A hot water distribution system comprising: a hot water distribution loop for delivering water at a predetermined temperature to fixtures spaced about the loop; a pump in said loop for circulating the water therein; means for supplying hot water at a temperature higher than said predetermined delivery temperature to the loop upstream of said pump; means for supplying cold water to said loop downstream of said pump; a thermostat responsive to the temperature of the water in the loop downstream of the point of entry of said cold water and upstream of said fixtures; and means controlled by said thermostat for regulating the relative quantities of high temperature water and cold water supplied to the loop.

2. A hot water distribution system comprising: a hot water distribution loop for delivering water at a predetermined temperature to fixtures spaced about the loop; a pump in said loop for circulating the water therein; means for supplying hot water at a temperature higher than said predetermined delivery temperature to the loop upstream of said pump; means for supplying cold water to said loop downstream of said pump; a thermostat responsive to the temperature of the water in the loop downstream of the point of entry of said cold water and upstream of said fixtures; and means controlled by said thermostat for regulating the relative quantities of high temperature water and cold water supplied to the loop, said regulating means including a modulating valve in at least one of the high temperature and cold water supply means controlling the passage of water therethrough.

3. A hot water distribution system comprising: a hot water distribution loop for delivering water at a predetermined temperature to fixtures spaced about the loop; a pump in said loop for circulating the water therein; means for supplying hot water at a temperature higher than said predetermined delivery temperature to the loop upstream of said pump; means for supplying cold water to said loop downstream of said pump; a thermostat responsive to the temperature of the water in the loop downstream of the point of entry of said cold water and upstream of said fixtures; a restriction in one of the high temperature and cold water supply means; and a modulating valve in the other supply means and controlled by said thermostat.

4. A hot water distribution system comprising: a hot water distribution loop for delivering water at a predetermined temperature to fixtures spaced about the loop; a pump in said loop for circulating the water therein; means for supplying hot water at a temperature higher than said predetermined delivery temperature to the loop upstream of said pump; means for supplying cold water to said loop downstream of said pump; a thermostat responsive to the temperature of the water in the loop downstream of the point of entry of said cold water and upstream of said fixtures; a restriction in the cold water supply means to the loop; and a modulating valve in the high temperature water supply means to the loop and controlled by said thermostat to regulate the relative amounts of high temperature water and cold water fed into the loop.

5. A hot water distribution system comprising: a hot water distribution loop for delivering water at a predetermined temperature to fixtures spaced about the loop; a pump in said loop for circulating the water therein; means for supplying hot water at a temperature higher than said predetermined delivery temperature to the loop upstream of said pump; means for supplying cold water to said loop downstream of said pump; a thermostat responsive to the temperature of the water in the loop downstream of the point of entry of said cold water and upstream of said fixtures; and a valve in the high temperature water supply line controlled by said thermostat to feed high temperature water into the loop whenever the temperature of the water in the loop at the thermostat falls below the predetermined delivery temperature, any otherwise excess water in the loop being fed therefrom in reverse direction through the cold water supply line when high temperature water is added to the loop without consumption therefrom.

6. A hot water distribution system comprising: a hot water distribution loop for delivering water at a predetermined temperature to fixtures spaced about the loop; a pump in said loop for circulating the water therein; means for supplying hot water at a temperature higher than said predetermined delivery temperature to the loop upstream of said pump; means for supplying cold water to said loop downstream of said pump; a thermostat responsive to the temperature of the water in the loop downstream of the point of entry of said cold water and upstream of said fixtures; a valve in the high temperature water supply line controlled by said thermostat to feed high temperature water into the loop whenever the temperature of the water in the loop at the thermostat falls below the predetermined delivery temperature, any otherwise excess water in the loop being fed therefrom in reverse direction through the cold water supply line when high temperature water is added to the loop without consumption therefrom; a bypass leading from said cold water supply line; and a check valve in said cold water supply line upstream of said bypass to prevent backup of a large volume of hot water into the cold water supply.

7. A hot water distribution system comprising: a storage tank for storing water at relatively high temperature; a distribution loop for delivering hot water to consumer fixtures located therealong at a lower predetermined temperature; a pump in said distribution loop for circulating the water therein; a high temperature water connection between said storage tank and the input side of said pump; a cold water supply line connected to said loop on the outlet side of said pump; a valve in the high temperature water supply line; and a thermostat in said loop downstream of said cold water supply line for controlling said valve.

8. A hot water distribution system comprising: a storage tank for storing water at relatively high temperature; a distribution loop for delivering hot water to consumer fixtures located therealong at a lower predetermined temperature; a pump in said distribution loop for circulating the water therein; a high temperature water connection between said storage tank and the input side of said pump; a cold water supply line connected to said loop on the outlet side of said pump; a valve in the high temperature water supply line; a thermostat in said loop downstream of said cold water supply line for controlling said valve; a bypass between said cold water supply line and the storage tank; and a check valve in said cold water supply line upstream of said bypass and preventing backup of hot water in the cold water supply line beyond said bypass.

9. A hot water distribution system comprising: a storage tank for storing water at relatively high temperature; a distribution loop for delivering hot water to consumer fixtures located therealong at a lower predetermined temperature; a pump in said distribution loop for circulating the water therein; a high temperature water connection between said storage tank and the input side of said pump; a check valve in said distribution loop upstream of said high temperature water connection to insure flow of high temperature water only toward the pump; a cold water supply line connected to said loop on the outlet side of said pump; a valve in the high temperature water supply line; a thermostat in said loop downstream of said cold water supply line for controlling said valve; a connecting pipe between said cold water supply line and the storage tank; and a check valve in said cold water supply line upstream of said connecting pipe and preventing backup of hot water in the cold water supply line therebeyond.

10. A hot water distribution system comprising: a storage tank for storing water at relatively high temperature; a distribution loop for delivering hot water to consumer fixtures located therealong at a lower predetermined temperature; a pump in said distribution loop for circulating the water therein; a high temperature water connection between said storage tank and the input side of said pump; a cold water supply line connected to said loop on the outlet side of said pump; a modulating valve in the high temperature water supply line; a thermostat in said loop downstream of said cold water supply line for controlling said modulating valve; and a restriction in said cold water supply line upstream of its point of connection to the loop whereby the relative percentages of high temperature and cold water supplied to the loop to replace water drawn off therefrom is controlled by modulation of the valve in the high temperature water connection to the loop.

References Cited in the file of this patent
UNITED STATES PATENTS

| | | |
|---|---|---|
| 1,780,379 | Durdin | Nov. 4, 1930 |
| 2,081,831 | Moore | May 25, 1937 |
| 2,099,310 | Mensing | Nov. 16, 1937 |
| 2,224,240 | Van Vulpen et al. | Dec. 10, 1940 |
| 2,282,013 | Wetzsteon | May 5, 1942 |
| 2,515,885 | Midyette | July 18, 1950 |
| 2,756,739 | Schaub | July 31, 1956 |
| 3,007,470 | Heeger | Nov. 7, 1961 |